United States Patent
John et al.

(10) Patent No.: US 12,448,939 B1
(45) Date of Patent: Oct. 21, 2025

(54) FUEL ADMISSION TUBE FOR ENHANCED MIXING IN GASEOUS FUEL ENGINE AND ENGINE OPERATING METHOD

(71) Applicant: Caterpillar Inc., Peoria, IL (US)

(72) Inventors: Bobby John, Peoria, IL (US);
Jonathan W. Anders, Peoria, IL (US);
Naga Krishna Chaitanya Kavuri, Melissa, TX (US); William Barnes, Rapid City, SD (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/639,186

(22) Filed: Apr. 18, 2024

(51) Int. Cl.
*F02M 55/02* (2006.01)
*F02M 35/10* (2006.01)
*F02M 61/18* (2006.01)

(52) U.S. Cl.
CPC .. *F02M 35/10216* (2013.01); *F02M 61/1813* (2013.01)

(58) Field of Classification Search
CPC .... F23R 3/286; F02M 35/10196; F02M 1/00; F02M 35/108
USPC ........................................................ 123/468
See application file for complete search history.

(56) References Cited

U.S. PATENT DOCUMENTS

| | | | | |
|---|---|---|---|---|
| 2,505,725 A | * | 4/1950 | Shepherd | F02D 19/105 123/527 |
| 3,905,756 A | | 9/1975 | Ferlin et al. | |
| 4,198,815 A | * | 4/1980 | Bobo | F23R 3/14 60/737 |
| 4,404,947 A | * | 9/1983 | Swanson | F02M 21/0239 123/585 |
| 5,636,510 A | * | 6/1997 | Beer | F23R 3/14 60/39.23 |
| 6,095,437 A | | 8/2000 | Nozawa et al. | |
| 7,270,313 B1 | | 9/2007 | Counts | |
| 9,506,439 B2 | | 11/2016 | Anders et al. | |
| 9,797,351 B2 | | 10/2017 | Svensson et al. | |
| 9,803,538 B2 | | 10/2017 | Anders et al. | |
| 9,915,190 B2 | | 3/2018 | Koci | |
| 9,920,714 B2 | | 3/2018 | Ginter et al. | |
| 10,036,356 B2 | | 7/2018 | Svensson | |
| 10,161,626 B2 | | 12/2018 | Mueller | |
| 10,550,807 B2 | * | 2/2020 | Kim | F02M 35/10288 |

(Continued)

FOREIGN PATENT DOCUMENTS

CN 207111263 U 3/2018
CN 218882395 U 4/2023
(Continued)

*Primary Examiner* — Logan M Kraft
*Assistant Examiner* — James J Kim
(74) *Attorney, Agent, or Firm* — Brannon Sowers & Cracraft PC

(57) ABSTRACT

An engine system includes an engine housing forming a plurality of intake ports, and a plurality of fuel admission tubes each forming a fuel passage and at least one mixing air opening fluidly connected to the fuel passage between a first tube end and a terminal end surface of a second tube end. The mixing air opening may be formed in an end cap of the fuel admission tube. A plurality of mixing air openings in a fuel admission tube may have at least one of a circumferential distribution or an axial distribution that is biased in a direction of an incoming flow of intake air. Related apparatus and methodology is also disclosed.

14 Claims, 4 Drawing Sheets

(56) References Cited

U.S. PATENT DOCUMENTS

| | | | |
|---|---|---|---|
| 11,078,826 B1* | 8/2021 | Chang | F02M 21/0275 |
| 11,549,429 B2 | 1/2023 | Gubba et al. | |
| 11,608,803 B2 | 3/2023 | Heher et al. | |
| 11,649,966 B1 | 5/2023 | Patra et al. | |
| 2012/0023951 A1 | 2/2012 | Parsania et al. | |
| 2015/0083085 A1* | 3/2015 | Ravenhill | F02M 19/03 |
| | | | 123/48 R |
| 2015/0211458 A1* | 7/2015 | Carpenter | F02M 61/18 |
| | | | 239/584 |
| 2017/0254259 A1* | 9/2017 | Johnson | F02M 35/10177 |
| 2018/0002645 A1* | 1/2018 | Bartley | C11D 1/44 |
| 2020/0049110 A1 | 2/2020 | Kato et al. | |

FOREIGN PATENT DOCUMENTS

| | | |
|---|---|---|
| JP | 2002228122 A | 8/2002 |
| JP | 2018084158 A | 5/2018 |
| KR | 100386577 B1 | 6/2003 |

* cited by examiner

FUEL ADMISSION TUBE FOR ENHANCED
MIXING IN GASEOUS FUEL ENGINE AND
ENGINE OPERATING METHOD

TECHNICAL FIELD

The present disclosure relates generally to a gaseous fuel engine system, and more particularly to a gaseous fuel admission tube having at least one mixing air opening fluidly connected to a fuel passage.

BACKGROUND

Internal combustion engines structured to operate on gaseous fuels have been the subject of significant investment of research and development resources in recent decades. In contrast to combustion regimes utilizing traditional liquid fuels, gaseous fuel engines have been demonstrated to produce lesser amounts of certain undesired emissions. In typical gaseous fuel combustion strategies, a gaseous fuel is delivered via port-injection, direct injection, or intake fumigation admission, to individual cylinders in an engine and ignited by way of an electrical spark. The controlled combustion of the gaseous fuel in the cylinders causes a rapid rise in temperature and pressure to drive pistons coupled to a crankshaft. A great many extensions and variations as to ignition strategy, piston design, valve timing, fuel-air mixing, and other properties are well-known and widely used. Engines utilizing traditional gaseous hydrocarbon fuels such as natural gas, methane, ethane, and various blends have seen widespread commercial success.

More recently, efforts have focused on utilizing non-traditional fuels including gaseous molecular hydrogen and various gaseous fuel blends containing gaseous molecular hydrogen. Hydrogen engines offer much promise with respect to reduced emissions, notably so-called greenhouse gases, but have yet to realize their full theoretical potential. Ease of ignition and extremely fast flame speeds as well as storage and handling challenges have created a host of potential obstacles as well as opportunities in connection with commercial implementation of hydrogen engines. It has been observed that the ignition and combustion properties of hydrogen motivates in the direction of optimizing mixing of the hydrogen with intake air prior to, or after, admitting the hydrogen to the cylinders, so as to avoid the development of pockets of unmixed fuel, or other issues in the cylinder that can make precisely controlling ignition timing challenging. One known example engine platform that can be operated on gaseous fuels including apparently hydrogen is set forth in U.S. Pat. No. 9,920,714 B2 to Ginter et al.

SUMMARY

In one aspect, an engine system includes an engine housing forming a plurality of intake ports each fluidly connected between an upstream intake air feed opening and a plurality of intake valve openings. The engine system further includes a plurality of fuel admissions tubes each forming a fuel passage extending from a first tube end forming a fuel inlet, to a second tube end having a terminal end surface extending circumferentially around a fuel outlet. Each of the plurality of fuel admission tubes further includes at least one mixing air opening formed therein and fluidly connected to the fuel passage at a location that is between the first tube end and the terminal end surface.

In another aspect, a method of operating an engine system includes feeding intake air through an upstream intake air feed opening through a common air cavity to a plurality of intake ports in an engine housing, and feeding a gaseous fuel through a plurality of fuel passages in a plurality of fuel admission tubes each extending through the common air cavity to one of the plurality of intake ports. The method further includes admitting some of the intake air through at least one mixing air opening in each of the plurality of fuel admission tubes into the respective fuel passage at a location that is fluidly between a fuel inlet and a fuel outlet of the respective fuel admission tube, and conveying intake air and gaseous fuel from each of the plurality of intake ports into a plurality of engine cylinders for combustion.

In still another aspect, a fuel admission tube for a gaseous fuel engine includes a tube body having an outer tube surface and an inner tube surface forming a fuel passage defining a curvilinear tube axis line and extending between a first axial end including a connector forming a fuel inlet, and a second axial end forming a fuel outlet. The tube body further includes at least one mixing air opening formed therein and fluidly connected to the fuel passage.

DETAILED DESCRIPTION

Figure 1:
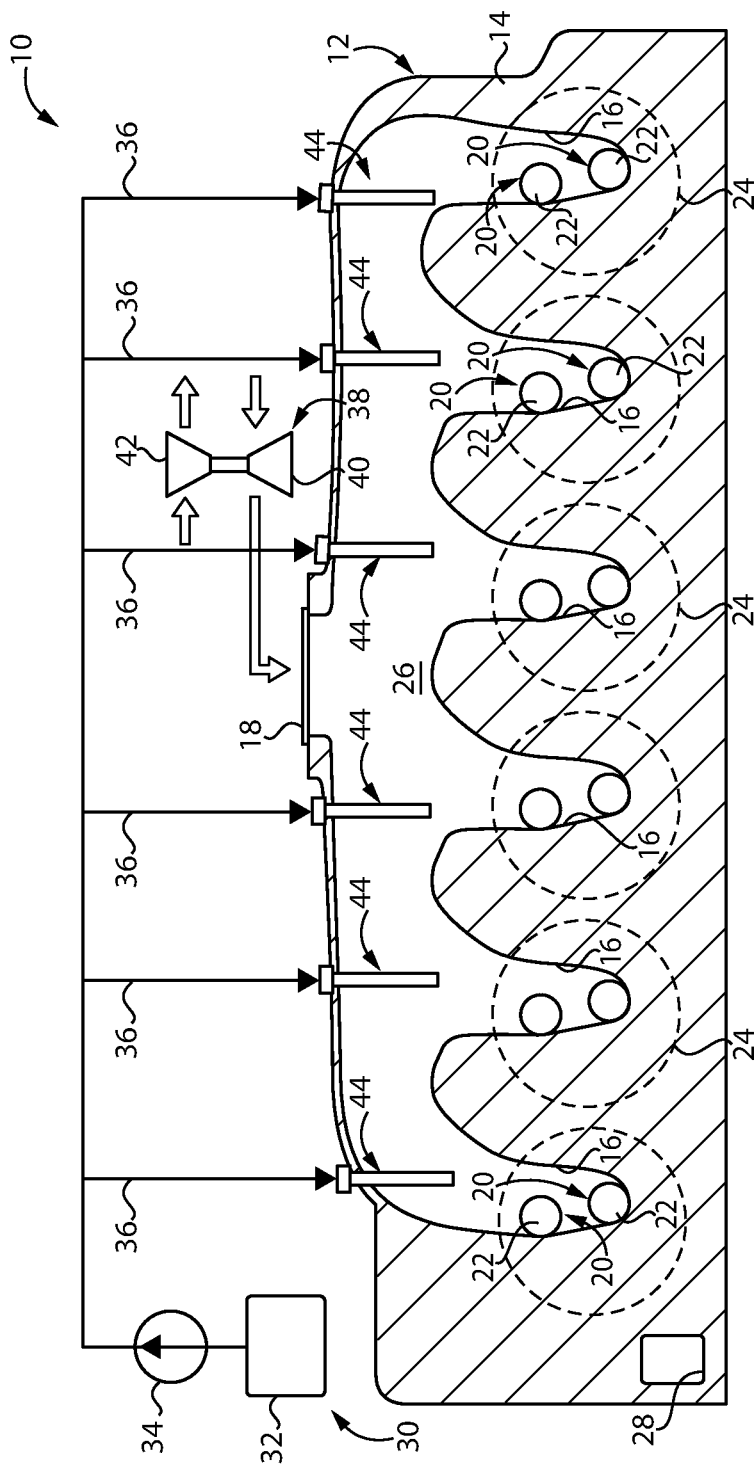
FIG. 1 is a diagrammatic view of a gaseous fuel engine system, according to one embodiment.

Referring to FIG. 1, there is shown an internal combustion engine system 10 according to one embodiment. Engine system 10 includes an engine 12 having an engine housing 14 forming a plurality of intake ports 16 fluidly connected to an upstream intake air feed opening 18. Intake air feed opening 18 may receive a feed of pressurized intake air from a compressor 40 in a turbocharger 38. Turbocharger 38 includes a turbine 42 operated by way of a flow of exhaust from engine 12 to rotate compressor 40 in a generally conventional manner. Each of intake ports 16 may extend from a common air cavity 26 fluidly connected to intake air feed opening 18 to a plurality of intake valve openings 20, typically two intake valve openings 20 per each intake port 16. Intake valves 22 are shown positioned in intake valve openings 20 and control fluid communication between intake ports 16 and a plurality of cylinders 24 in a generally conventional manner. Engine 12 may include any number of cylinders in any suitable arrangement such as a V-pattern, an in-line pattern, or still another. In the illustrated embedment cylinders 24 are six in number and arranged in an in-line pattern. It will be appreciated that cylinders 24 may be formed in a cylinder block and intake ports 16 may be formed in a cylinder head attached to the subject cylinder block. In the illustrated embodiment engine housing 14 includes a so-called slab cylinder head associated with a plurality of cylinders 24, including all of cylinders 24 as illustrated. Cylinder head sections each associated with at least one but less than all of the cylinders in an internal combustion engine are nevertheless within the scope of the present disclosure. One or more coolant cavities 28 may be formed in engine housing 14 to convey a liquid coolant for dissipation of heat produced from combustion of a gaseous fuel in cylinders 24. It will also be appreciated that exhaust ports, exhaust valve openings, and exhaust valves will also be included in engine 12. Engine system 10 may be applied for propulsion of a land vehicle or a marine vessel, electrical power generation, operation of a pump or a compressor, or for various other industrial purposes.

Engine system 10 also includes a fuel system 30. Fuel system 30 includes at least one fuel supply 32, at least one fuel pump 34, and a plurality of fuel supply conduits 36. Engine system 10 may include a gaseous fuel engine system wherein fuel supply 32 contains a suitable gaseous fuel in a compressed state or in a liquified state. Embodiments are contemplated where engine system 10 includes multiple fuel supplies each containing a different gaseous fuel to be blended for combustion in cylinders 24. Suitable gaseous fuels include hydrocarbon fuels such as natural gas, methane, ethane, and various blends. In a practical implementation, engine system 10 is configured to operate on a hydrogen fuel including gaseous molecular hydrogen or blends of gaseous molecular hydrogen and a hydrocarbon fuel such as natural gas. Engine system 10 will typically be spark-ignited and suitably equipped with a plurality of sparkplugs each forming a spark gap within one of cylinders 24.

Figure 2:
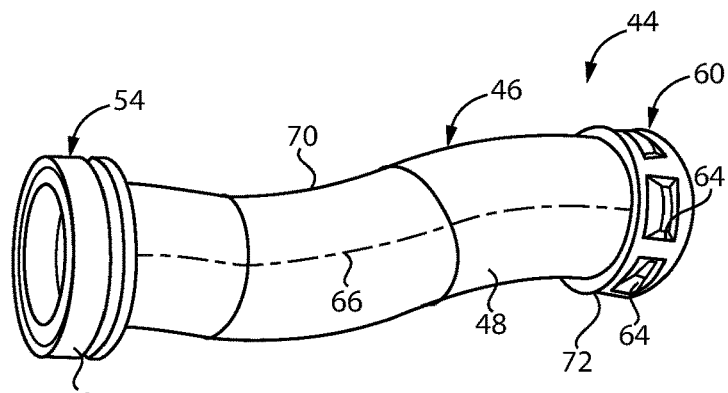
FIG. 2 is a side diagrammatic view of a fuel admission tube, according to one embodiment.
Figure 3:
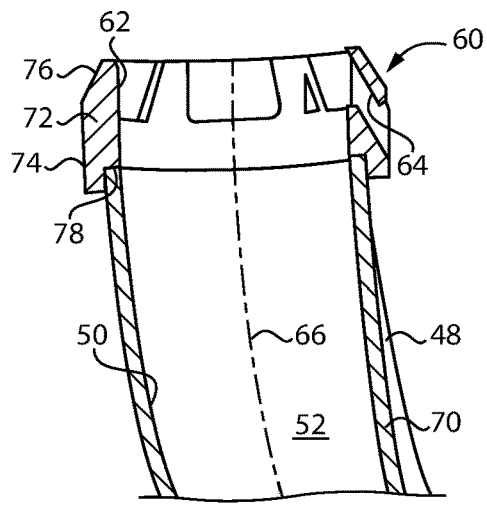
FIG. 3 is a sectioned side diagrammatic view of a fuel admission tube as in FIG. 2.

Referring also now to FIGS. 2 and 3, fuel conduits 36 may extend to a plurality of fuel admission tubes 44, an exemplary one of which is shown in FIGS. 2 and 3. Fuel admission tube 44 includes an elongate tube body 46 having an outer tube surface 48, and an inner tube surface 50 forming a fuel passage 52 defining a curvilinear tube axis line 66 and extending between a first tube end or first axial end 54 and a second tube end or second axial end 60. Curvilinear tube axis line 66 should be generally understood as a central axis of fuel passage 52 following a curvature of fuel passage 52, in turn generally tracking a longitudinally curved shape of each respective fuel admission tube 44. As will be appreciated from the drawings, fuel admission tubes 44 may have a plurality of different tube shapes. Fuel admission tubes 44 may also include a plurality of different tube lengths. Collectively, the plurality of fuel admission tubes 44 in engine system 10 and other engine systems according to the present disclosure may include among them at least one of a plurality of different tube lengths or a plurality of different tube shapes. First axial end 54 includes a connector 56 for connecting to a fuel supply conduit 36 of fuel system 30 as discussed herein. Connector 56 may include a fitting, a collar, or a relatively enlarged or relatively narrowed diameter. Any suitable geometry for connector 56 that enables connecting with a fuel supply conduit and/or an engine housing itself is within the scope of the present disclosure.

Second axial end 60 forms a fuel outlet 62. Tube body 46 includes at least one and typically a plurality of mixing air openings 64 formed therein and fluidly connected to fuel passage 52. Second axial end 60 includes a terminal end surface 68 extending circumferentially around fuel outlet 62. Mixing air openings 64 may be fluidly connected to fuel passage 52 at a location that is between first axial end 54 and terminal end surface 68. In the illustrated embodiment, fuel admission tube 44 is configured in multiple pieces where tube body 46 includes a conduit piece 70 and an attached end cap 72 that forms fuel outlet 62. Mixing air openings 64 may be formed in end cap 72.

Focusing on FIG. 3, end cap 72 may include an outer cap surface 74 that is cylindrical and extends circumferentially around tube axis line 66, and an angled transition surface 76 such as a conical surface that transitions between outer cap surface 74 and terminal end surface 68. End cap 72 may further include a ledge 78, such as an internal ledge, that abuts a tip of conduit piece 70. As can be further noted from FIGS. 2 and 3 mixing air openings 64 may have a circumferential distribution around tube axis line 66. It can also be noted mixing air openings 64 are angularly oriented relative to tube axis line 66.

Figure 4:
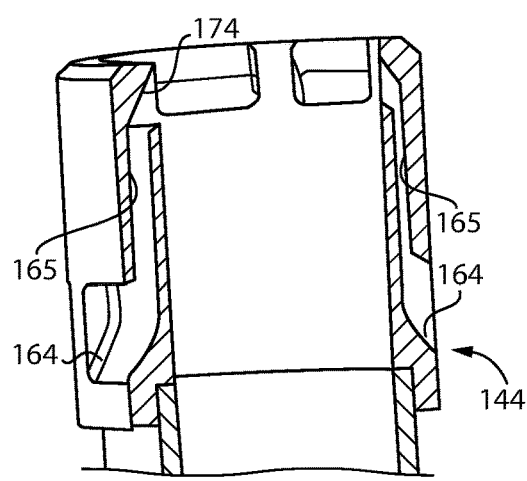
FIG. 4 is a sectioned side diagrammatic view of a fuel admission tube according to another embodiment.
Figure 5:
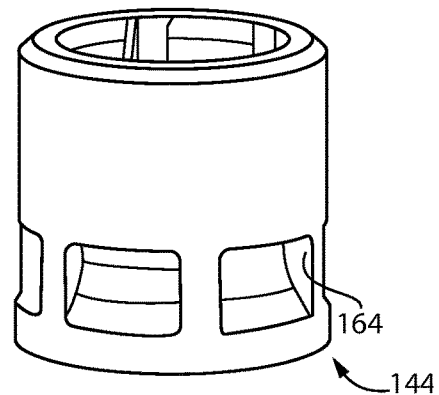
FIG. 5 is a diagrammatic view of an end cap for a fuel admission tube as in FIG. 4.

Turning now to FIGS. 4 and 5, there is shown a fuel admission tube 144 including an end cap 172 having a different configuration than end cap 72 of FIGS. 2 and 3. End cap 172 includes a plurality of mixing air openings 164 and is relatively elongated compared to end cap 72. FIG. 4 further shows each mixing air opening 164 including a longitudinally extending internal passage 165 that connects to an air outlet 174.

Figure 6:
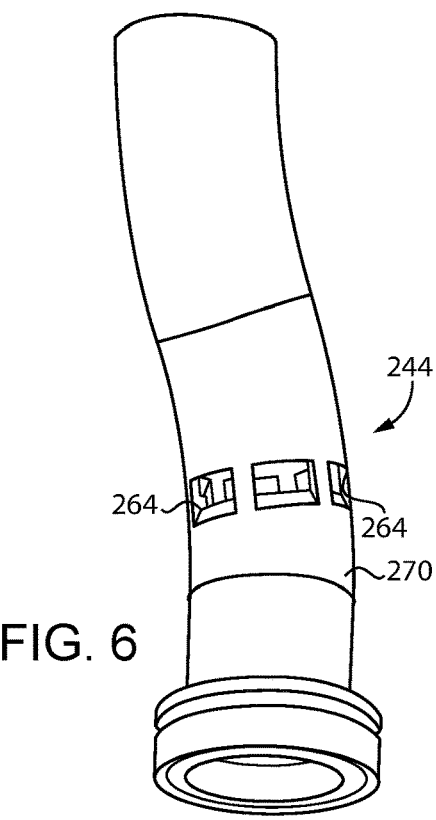
FIG. 6 is a side diagrammatic view of a fuel admission tube, according to another embodiment.
Figure 7:
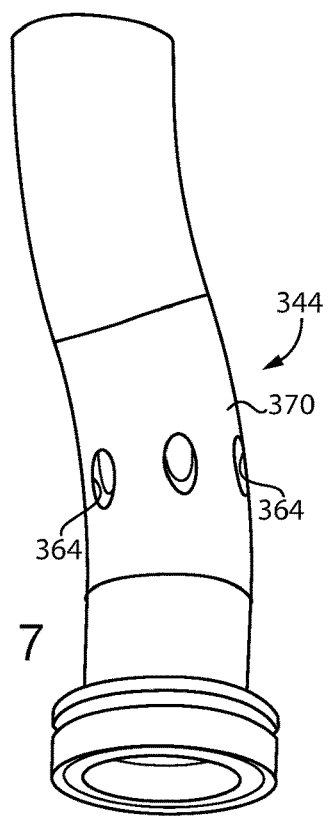
FIG. 7 is a side diagrammatic view of a fuel admission tube, account to yet another embodiment.

Referring now to FIG. 6, there is shown yet another embodiment of a fuel admission tube 244 including a conduit piece 470 having a plurality of mixing air openings 264 formed therein at a generally upstream or medial location in conduit piece 270. Mixing air openings 264 have the form of square or rectangular windows or the like coupled with internal structures of conduit piece 270 that assists in deflecting air in a generally downstream direction upon entering conduit piece 270, generally upward in the FIG. 6 illustration. FIG. 7 shows another fuel admission tube 344 including a plurality of mixing air openings 364 in a conduit piece 370 and having the form of angled circular or elliptical holes that communicate to an interior of conduit piece 370. Each of the embodiments of FIGS. 6 and 7 could be equipped with an end cap similar to those described above or installed and used in an engine without end caps.

Figure 8:
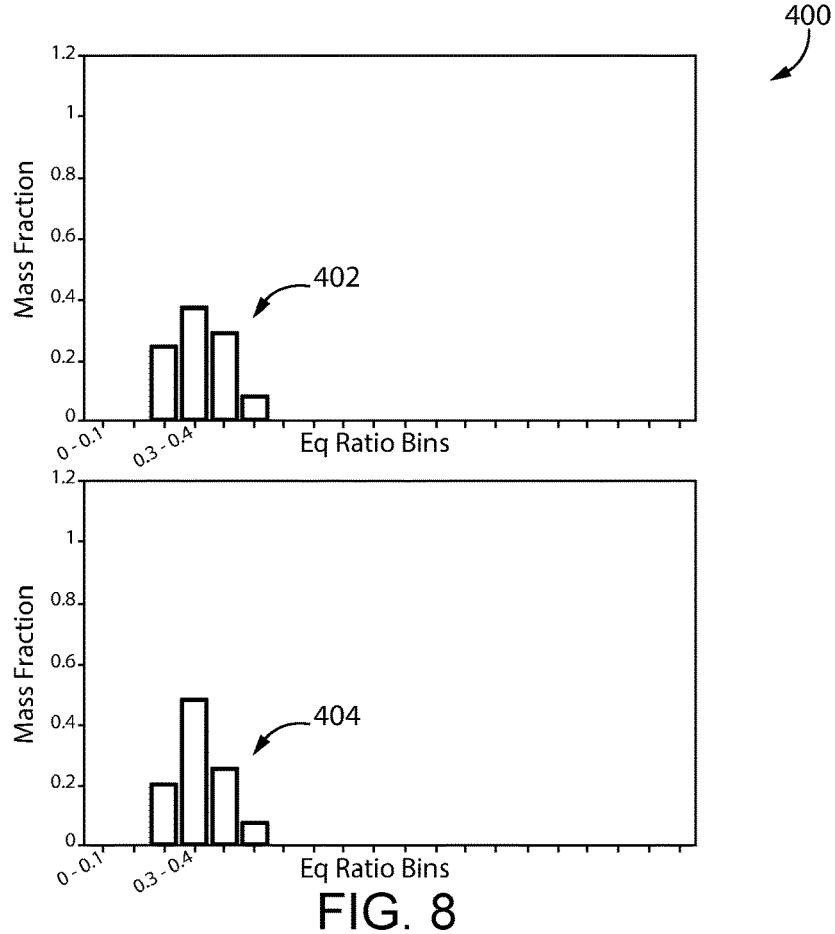
FIG. 8 is a graph showing mass fraction of equivalence ratios in a cylinder for a known design in comparison to an embodiment of the present disclosure.

Referring now to FIG. 8, there is shown a graph 400 illustrating mass fractions of different equivalence ratio "bins" in a cylinder for a known design 402 using a fuel admission tube not equipped with mixing air openings, in comparison to a design according to the present disclosure 404 where mixing air openings are used. It can be noted that the mass fraction for equivalence ratio of approximately 0.3-0.4 in the design employing mixing air openings 404 is greater, above approximately 0.4 as compared to the mass fraction for the same equivalence ratio in the design lacking mixing air openings 402, showing better overall mixing of fuel and air.

Figure 9:
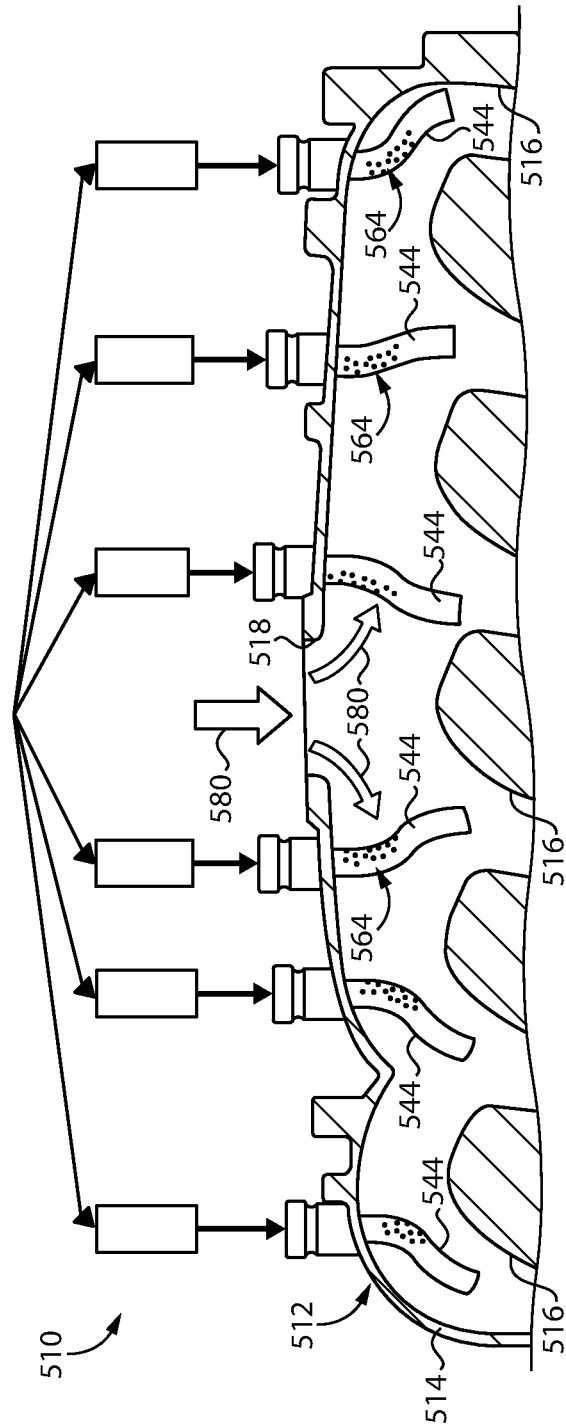
FIG. 9 is a diagrammatic view of a gaseous fuel engine system, according to another embodiment.

Turning now to FIG. 9 there is shown an engine system 510 according to another embodiment and including an engine 512 having an engine housing 514 forming a plurality of intake ports 516 fluidly connecting between an upstream intake air feed opening 518 and a plurality of intake valve openings not visible in the view of FIG. 9. Engine system 510 also includes a plurality of fuel admission tubes 544 which will each be understood to form a fuel passage extending from a first tube end forming a fuel inlet, to a second tube end forming a fuel outlet. A flow of intake air is shown via arrows 580.

Figure 10:
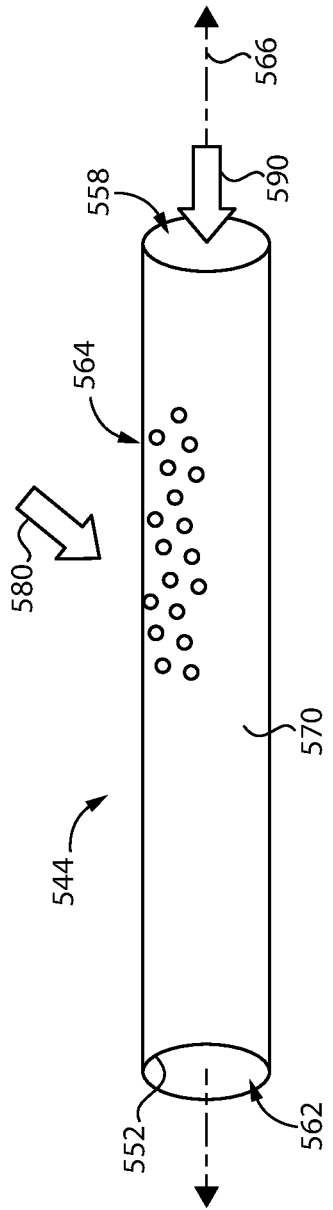
FIG. 10 is a side diagrammatic view of a fuel admission tube as in the engine system of FIG. 9.

FIG. 10 shows diagrammatically an example one of fuel admission tubes 544. Fuel admission tube 544 includes an elongate tube body 570 including a fuel passage 552 defining a curvilinear tube axis line 566 extending between a fuel inlet 558 and a fuel outlet 562. Fuel admission tube 544 includes a plurality of mixing air openings 564. Mixing air openings 564 have a circumferential distribution around tube axis line 566 and an axial distribution relative to tube axis line 566. It can also be noted from FIG. 10 that mixing air openings 564 have a circumferentially biased distribution and an axially biased distribution. When installed in engine system 510 for service, mixing air openings 564 can be oriented at least in part towards a direction of incoming intake air flow from upstream intake air opening 518. It can thus be appreciated that during operating engine system 510 an incoming flow of intake air 580 can be directed generally at mixing air openings 564. Among the plurality of fuel admission tubes 544 in engine 512 a number and/or an arrangement of mixing air openings 564 might vary based upon varied flow paths of incoming intake air toward the respective intake ports 516. A number of mixing air openings 564 might be greater than five, and in some embodiments greater than ten, potentially greater than twenty in some instances.

INDUSTRIAL APPLICABILITY

Referring to the drawings generally, but referring to the embodiment of FIG. 1, operating engine system 10 includes feeding intake air through upstream intake air feed opening 18 through common air cavity 26 to intake ports 16 in engine housing 14. At appropriate timings, gaseous fuel is fed through fuel passages 52 in the plurality of fuel admission tubes 44 each extending through common air cavity 26 to, and potentially into, one of intake ports 16. Some of the intake air may be admitted through at least one mixing air opening 64 into the respective fuel passage 52 at a location that is fluidly between fuel inlet 58 and fuel outlet 62 of the respective fuel admission tube 44. The intake air and gaseous fuel mixed within or just after exiting fuel admission tubes 44 is conveyed from each of intake ports 16 into engine cylinders 24 for combustion therein. Ignition of the gaseous fuel and air mixture may occur by way of spark-ignition in each of cylinders 24.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An engine system comprising:
an engine housing forming a plurality of intake ports each fluidly connecting between an upstream intake air feed opening and a plurality of intake valve openings, such that a feed of air through each respective one of the plurality of intake ports enters a respective cylinder of the engine system through the respective plurality of intake valve openings, the engine housing further forming a common air cavity fluidly connecting the upstream intake air feed opening to the plurality of intake ports, and each of the plurality of fuel admission tubes extends through the common air cavity;
a plurality of fuel admission tubes each forming a fuel passage extending from a first tube end forming a fuel inlet, to a second tube end having a terminal end surface extending circumferentially around a fuel outlet; and
each of the plurality of fuel admission tubes further including at least one mixing air opening formed therein and fluidly connected to the fuel passage at a location that is between the first tube end and the terminal end surface, the at least one mixing air opening being configured to admit some of the intake air therethrough, and the at least one mixing air opening includes a plurality of mixing air openings having both an axial distribution and a circumferential distribution in the fuel admission tube.

2. The engine system of claim 1 wherein each of the plurality of fuel admission tubes defines an outgoing fuel axis extending into one of the plurality of intake ports.

3. The engine system of claim 1 wherein the plurality of mixing air openings are biased in at least one of the axial distribution or the circumferential distribution toward a direction of incoming intake air flow from the upstream intake air opening.

4. A method of operating an engine system comprising:
feeding intake air from an upstream intake air feed opening through a common air cavity to a plurality of intake ports in an engine housing;
feeding a gaseous fuel through a plurality of fuel passages in a plurality of fuel admission tubes each extending through the common air cavity to one of the plurality of intake ports;
admitting some of the intake air through at least one mixing air opening in each of the plurality of fuel admission tubes into the respective fuel passage at a location that is fluidly between a fuel inlet and a fuel outlet of the respective fuel admission tube; and
conveying the intake air and gaseous fuel from each of the plurality of intake ports into a plurality of engine cylinders for combustion through a first intake valve opening located downstream from the intake air feed opening and through a second intake valve opening located downstream from the first intake valve opening.

5. The method of claim 4 wherein the gaseous fuel includes gaseous molecular hydrogen.

6. The method of claim 4 wherein the at least one mixing air opening includes a plurality of mixing air openings having an axial distribution in the respective fuel admission tube.

7. The method of claim 6 wherein the plurality of mixing air openings have a circumferential distribution in the respective fuel admission tube.

8. The method of claim 7 wherein the plurality of mixing air openings are biased in at least one of the axial distribution or the circumferential distribution in the respective fuel admission tube toward a direction of incoming intake air flow from the upstream intake air feed opening.

9. The method of claim 4 wherein the admitting some of the intake air includes admitting the intake air through a plurality of mixing air openings formed in a plurality of end caps of the plurality of fuel admission tubes.

10. A fuel admission tube for a gaseous fuel engine comprising:
- a tube body including an outer tube surface, and an inner tube surface forming a fuel passage defining a curvilinear tube axis line and extending between a first axial end including a connector forming a fuel inlet, and a second axial end forming a fuel outlet; and
- the tube body including a plurality of mixing air openings formed therein and fluidly connected to the fuel passage;
- wherein the plurality of mixing air openings have an axial distribution.

11. The fuel admission tube of claim 10 wherein the plurality of mixing air openings includes a plurality of mixing air openings formed in the tube body between the first axial end and the second axial end and having a circumferential distribution around the curvilinear tube axis line.

12. The fuel admission tube of claim 11 wherein at least one of the circumferential distribution or the axial distribution includes a biased distribution.

13. A fuel admission tube for a gaseous fuel engine comprising:
- a tube body including an outer tube surface, and an inner tube surface forming a fuel passage defining a curvilinear tube axis line and extending between a first axial end including a connector forming a fuel inlet, and a second axial end forming a fuel outlet; and
- the tube body including at least one mixing air opening formed therein and fluidly connected to the fuel passage;
- wherein the tube body includes a conduit piece and an attached end cap forming the fuel outlet, and the at least one mixing air opening includes a plurality of mixing air openings formed in the end cap.

14. The fuel admission tube of claim 13 wherein the at least one mixing air opening is angularly oriented relative to the curvilinear tube axis line.

* * * * *